(12) United States Patent  
Rosenau

(10) Patent No.: US 7,793,000 B2
(45) Date of Patent: Sep. 7, 2010

(54) METHOD FOR PREPARATION OF DATA FOR LOADING INTO A DATA PROCESSING DEVICE

(75) Inventor: Dirk Rosenau, Berlin (DE)

(73) Assignee: Francotyp-Postalia GmbH (DE)

( * ) Notice: Subject to any disclaimer, the term of this patent is extended or adjusted under 35 U.S.C. 154(b) by 962 days.

(21) Appl. No.: 11/322,071

(22) Filed: Dec. 29, 2005

(65) Prior Publication Data

US 2006/0179159 A1     Aug. 10, 2006

(30) Foreign Application Priority Data

Dec. 30, 2004   (DE) ...................... 10 2004 063 812

(51) Int. Cl.
*G06F 15/16* (2006.01)
(52) U.S. Cl. ................. 709/247; 709/232; 709/244; 370/477; 370/521; 370/352; 370/338; 382/232; 708/203
(58) Field of Classification Search ............... 709/247, 709/244, 232; 358/1.15, 402, 426.03, 448, 358/232; 370/477, 521, 352, 338, 392; 382/232–253; 708/203
See application file for complete search history.

(56) References Cited

U.S. PATENT DOCUMENTS

| | | | | |
|---|---|---|---|---|
| 6,097,499 A * | 8/2000 | Casey et al. | ................. | 358/1.16 |
| 6,967,745 B1 * | 11/2005 | Konno et al. | ................. | 358/1.9 |
| 7,085,020 B2 * | 8/2006 | Trelewicz | .............. | 358/426.13 |
| 7,305,490 B2 * | 12/2007 | Metz et al. | ................... | 709/247 |
| 7,313,132 B2 * | 12/2007 | Inoue et al. | ................. | 370/352 |

\* cited by examiner

*Primary Examiner*—Wing F Chan
*Assistant Examiner*—Ruolei Zong
(74) *Attorney, Agent, or Firm*—Schiff Hardin LLP

(57) ABSTRACT

In a method and arrangement for preparation of data for loading from a first data processing device into a second data processing device via a first data connection, a number of transmission-ready transmission data packets are generated in at least one packetizing step from the data to be loaded into the second data processing device; and at least one load parameter influencing the total load time until a complete loading of the data into the second data processing device is determined in a determination step preceding the packetizing step. The generation of the transmission data packets ensues in the at least one packetizing step dependent on the first load parameter.

46 Claims, 5 Drawing Sheets

METHOD FOR PREPARATION OF DATA FOR LOADING INTO A DATA PROCESSING DEVICE

BACKGROUND OF THE INVENTION

1. Field of the Invention

The present invention concerns a method for preparation of data for loading from a first data processing device into a second data processing device via a data connection, of the type wherein a number of transmission data packets ready for transmission are generated in a packetizing step from the first data to be loaded into the second data processing device. The invention furthermore concerns an arrangement for loading data with such a method.

2. Description of the Prior Art

Upon loading of data from a first data processing device into a second data processing device, the data to be transmitted are normally sub-divided into one or more smaller packets and transmitted to the second data processing device. The partial data which form the data packets are frequently compressed according to a rigid scheme in order to shorten the total load time until the complete allocation, i.e. the complete availability of the data in the second data processing device. It is likewise known to compress the data parts of the data packets—again according to a rigid scheme—or to transmit them uncompressed dependent on the resulting size of the data packets.

For a communication with one or more second data processing devices of the same type, this may in fact be a practical procedure. For loading data from a first data processing device into second data processing devices of different types, however, the problem frequently exists that significantly different total load times occur until the complete allocation of the data in the second data processing device, dependent on the transfer speed of the respective data connection and the processing speed of the transferred data in the second data processing device. Despite compression of the data, this can lead to a comparably high total load time dependent on the capacity of the second data processing device.

As has been shown, this is because the second data processing device neutralizes or even reverses the speed advantage due to the faster transfer of the compressed packets given a low processing speed of the compressed data. This can particularly be the case given lower processor power and/or lower transfer speed within the second data processing device.

SUMMARY OF THE INVENTION

An object of the present invention is to provide a method and an arrangement of the type described above that do not exhibit the disadvantages cited above, or at least do not exhibit them to the same degree, and in particular that enable optimally short total load times independent of the capacity of the data transfer and the second data processing device.

The present invention is based on the recognition that, independent of the capacity of the data transmission or of the second data processing device, optimally short total load times can be achieved when at least one load parameter, that at least influences the load time until the complete loading of the first data into the second data processing device, is determined in a determination step preceding the packetizing step, and the generation of the transmission data packets in the at least one packetizing step ensues dependent on the load parameter.

By means of the determination of the at least one load parameter and generation of the transmission data packets dependent on the load parameter, it is possible to react to specifics of the current combination (constellation) and, dependent on this, to realize an optimized preparation, in particular a distribution of the first data in the transmission data packets optimized with regard to an optimally fast availability of the first data in the second data processing device.

In principle, any parameters of the second data processing device (and/or parameters of the first data connection) that have an influence on the total load time of the first data in the second data processing device can be considered for use as a load parameter.

A maximum storage capacity available for the processing of the transmission data packets in the second data processing device preferably is determined in the determination step as a first load parameter. This ultimately determines the maximum size of the data packets that can be processed by the second data processing device. If this were exceeded, the second data processing device would have to use other memory ranges at the cost of the achievable processing speed or reject the data packets, and the total load time would significantly lengthen.

Additionally or alternatively, at least one transfer speed value representative of the transfer speed between the first and second data processing devices can be determined as the load parameter. If applicable, an optimal packet size which ensures an optimally fast transfer can then be determined dependent on this transfer speed value.

Additionally or alternatively, a processing speed value representative of the processing speed of the transmission data packets in the second data processing device can be determined as the load parameter. This processing speed value influences the total load time to a significant degree.

Lastly, a data type value representative of the type of the first data can additionally or alternatively be determined as the load parameter. This data type can likewise influence the total load time inasmuch as it, for example, supplies an indication of the compressibility of the first data. For example if, due to their type, the first data allow only a slight degree of compression, it can absolutely be that the speed disadvantage due to the additional processing time required as a consequence of the compression more than outweighs the speed advantage in the transfer.

The determination of the at least one first load parameter in principle can ensue in any suitable manner. In preferred variants of the inventive method, dependent on the first data connection and/or the second data processing device, the at least one first load parameter is read out from a first memory of the first data processing device. Suitable tables or the like with which the first data processing device can determine the corresponding load parameter or load parameters, can be stored in this first memory.

The stored load parameter or load parameters can have been experimentally or calculationally determined in advance from technical data of the appertaining second data processing device for each possible individual second data processing device or the possible types of the second data processing device. Variables that influence the processing speed of the second data processing device are, for example, the available data bus width (32 bit, 16 bit, 8 bit), types, sizes and access times of the RAM and ROM modules of the second data processing device, processor frequency, cache size, DMA load, etc.

The load parameters can be updated, in particular continuously updated. This can ensue using acknowledgements for concluded load processes with the respective second data processing device, or a second data processing device of the respectively registered type.

In other variants of the invention, the at least one load parameter can originate from the second data processing device. For example, it can be transmitted to the first data processing device initiated by a corresponding request of the first data processing device to the second data processing device. The second data processing device can likewise independently already transmit it to the first data processing device.

In further variants of the inventive method, the determination of the at least one load parameter ensues experimentally at least once, but preferably given each new transaction. For this purpose, at least one test data packet is formed from a test data set in a test step, and the test data packet is transmitted to the second data processing device in the determination step to determine the at least one load parameter. Conclusions about the appertaining load parameter or parameters can then be made from the progression of the transmission and processing of the test data packet.

The transmission time until the complete transmission of the test data packet to the second data processing device preferably is determined in the test step. A transfer speed value representative of the transfer speed of the test data packet between the first and second data processing device is then determined from the transmission time. As stated above, as a load parameter this influences the total load time and can be considered in an advantageous manner in the distribution of the data.

Furthermore, the processing time until the complete allocation of the received test data packet in the second data processing device can be determined in a second test step. A processing speed representative of the processing speed of data packets in the second data processing device is then determined from the processing time. As stated above, the latter as well as a load parameter, influences the total load time and can likewise be considered in an advantageous manner in the distribution of the data.

In an embodiment of the inventive method, a second test data packet is formed from the test data set in a third test step, and the second test data packet is transmitted to the second data processing device in the determination step to determine the at least one load parameter. This second test data packet can have been formed in a different manner than the first test data packet and, using the load parameter determined with it, enables a comparison and an optimization of the distribution of the data.

The second transmission time until the complete transmission of the second test data packet to the second data processing device is determined in the third test step. A second transfer speed value representative of the transfer speed of the second test data packet between the first and second data processing device is then determined from the second transmission time. A comparison of the transfer speed values for the different test data packets is thus possible.

Furthermore, the second processing time until the complete allocation of the received second test data packet in the second data processing device can be advantageously determined in a fourth test step. A second processing speed representative of the processing speed of second data packets in the second data processing device is then determined from the second processing time. A comparison of the processing speed values for the different test data packets is thus possible.

The second test data packet can be generated in any suitable manner deviating from the first test data packet. In the third sub-step the second data packet is preferably generated under compression of the first test data set. A comparison of the load parameters for compressed and non-compressed test data packets is hereby possible.

Preferably, at least one first data packet is generated from a first data subset of the first data in a first sub-step in the at least one packetizing step. In a second sub-step, an estimation of the first load time of the first data packet then ensues using the at least one first load parameter for the first data packet. Particularly simple conclusions can be drawn from this about the total load time.

In a third sub-step, the first load time determined in the second sub-step is furthermore advantageously compared with a load time comparison value in a load time comparison. A selection of the first data packet as a transmission data packet dependent on the result of the load time comparison then ensues in a fourth sub-step.

The comparison can be undertaken with a specific threshold value as a load time comparison value in the load time comparison. If the first load time is then, for example, below such a predetermined load time comparison value, the selection of the first data packet as a transmission data packet ensues. If this is not the case, an appropriate reaction occurs; for example, a re-determination of the first data subset can ensue or another preparation of the first data subset can ensue.

A second data packet preferably is generated from the first data subset in the first sub-step. A second estimation of the second load time of the second data packet then ensues in the second sub-step using the at least one first load parameter for the second data packet. A direct comparison of the load times of the first and second data packet thus is possible, such that the second load time determined in the second sub-step is advantageously used as a load time comparison value in the third sub-step and a selection of the first data packet or of the second data packet as a transmission data packet ensues in the fourth sub-step dependent on the result of the load time comparison. That data packet with the smaller load time is naturally selected as a transmission data packet.

The second data packet can be generated in any suitable manner deviating from that of the first data packet. In the first sub-step the second data packet is preferably again generated under compression of the first data subset in order to enable a direct comparison of the preparation variants.

With further variants of the inventive method, a maximum available storage capacity in the second data processing device for the processing of the transmission data packets is determined as a first load parameter in the determination step. In the first sub-step, the storage capacity total is then formed from the first storage capacity required for the storage of the first data packet and the second storage capacity required for the storage of the second data packet. The storage capacity total is compared with the maximum available storage capacity. For the case of a storage capacity total exceeding the maximum available storage capacity, a new first data packet and a new second data packet are then generated, whereby the first data subset is reduced and/or the compression rate is increased in the generation of the second data packet. It is thus ensured that the maximum storage capacity available in the second data processing device is not exceeded, so a smooth processing is ensured in the second data processing device.

In other variants of the inventive method, an optimization (i.e. minimization) of the total load time ensues. For this purpose, a first optimization step is conducted. A third estimation of the first total load time of the first data given a distribution of the first data into first data packets of the size of the first data subset ensues in this first optimization sub-step. A variation of the first data subset then ensues in a second optimization sub-step. The third estimation with first data packets of the size of the new first data subset is then repeated in a third optimization sub-step. Finally, in a fourth optimization sub-step the determined new first total load time is compared with the determined previous first total load time in a first total load time comparison. An optimization of the total load time can then ensue in an advantageous manner dependent on the comparison.

A further variation of the first data subset for reduction of the first total load time advantageously ensues dependent on the result of the first total load time comparison in a fifth optimization sub-step in the first optimization step. In a sixth optimization sub-step, at least the fourth optimization sub-step is then repeated. The fifth and sixth optimization sub-steps preferably are repeated until the first total load time has approached a first minimum with a predeterminable tolerance. The tolerance is selected sufficiently large in order to arrive at a conclusion of the optimization after a few variations.

The optimization can ensue isolated for a single type of the preparation of the first data. In further variants of the invention, different types of the preparation of the first data are compared with one another, or are otherwise considered in the optimization.

In a second optimization step, a fourth estimation of the second overall load time of the first data given a distribution of the first data into second data packets of a size deviating from the size of the first data sub-set thereby advantageously ensues in a seventh optimization sub-step. A variation of the first data subset then ensues in an eighth optimization sub-step. The fourth estimation with second data packets of the size of the new first data subset is repeated in a ninth optimization sub-step. In a tenth optimization sub-step, the determined new total load time is compared with the determined previous second total load time in a second total load time comparison.

A further variation of the first data subset for reduction of the first total load time ensues dependent on the result of the second total load time comparison in an eleventh optimization sub-step in the second optimization step. In a twelfth optimization sub-step, at least the tenth optimization sub-step is then repeated. The eleventh and twelfth optimization sub-steps are preferably repeated until the second total load time has approached a second minimum with a predeterminable tolerance. Again, the tolerance is selected sufficiently large in order to already arrive at a conclusion of the optimization after a few variations.

The first minimum and the second minimum then are compared with one another in a thirteenth optimization sub-step and the data packet with the lowest total load time is selected as a transmission data packet.

Furthermore, the present invention concerns a method for loading data from a first data processing device into a second data processing device via a first data connection, wherein the data are prepared for loading in a preparation step and are loaded into the second data processing device in a load step, with the preparation of the data ensuing in the preparation step with a method as described above. The advantages of the inventive method for preparation of the data are achieved in this loading method to the same degree.

In the preparation step, the respective transmission data packet is advantageously provided with a packet description and, in the load step, is processed dependent on the packet description after the receipt in the second data processing device. A simple and fast, preparation-adapted processing of the transmission data packets in the second data processing device thus is achieved.

The present invention furthermore concerns an arrangement for loading data from a first data processing device into a second data processing device, with a first data processing device and a second data processing device that can be connected with the first data processing device via a data connection. The first data processing device is fashioned to generate a number of transmission-ready transmission data packets from the data to be loaded into the second data processing device. The first data processing device determines at least one load parameter that influences the total load time until the complete loading of the data into the second data processing device. Furthermore, the first data processing device generates the transmission data packets dependent on the first load parameter.

The inventive method can be implemented with this arrangement. The described variants and advantages are achieved to the same degree with this arrangement.

In preferred variants of the inventive arrangement, the first data processing device has a memory in which a number of load parameters are stored. The first data processing device is then fashioned to read out the at least one load parameter from this memory dependent on the data connection and/or the second data processing device.

In variants of the inventive arrangement with experimental determination (described above) of the at least one load parameter, the determination of the values required for this purpose can ensue alone or jointly with the first data processing device and the second data processing device. In other words, the first data processing device and/or the second data processing device can be fashioned to carry out the method steps illustrated above.

The present invention can be used in connection with any application in which data are to be loaded from a first data processing device into a second data processing device. Due to the number of different second data processing devices with different performance characteristics that should be accommodated, the invention can be particularly advantageously used in connection with the loading of data from, for example, a remote data center into different franking machines.

DESCRIPTION OF THE PREFERRED EMBODIMENTS

Figure 1:
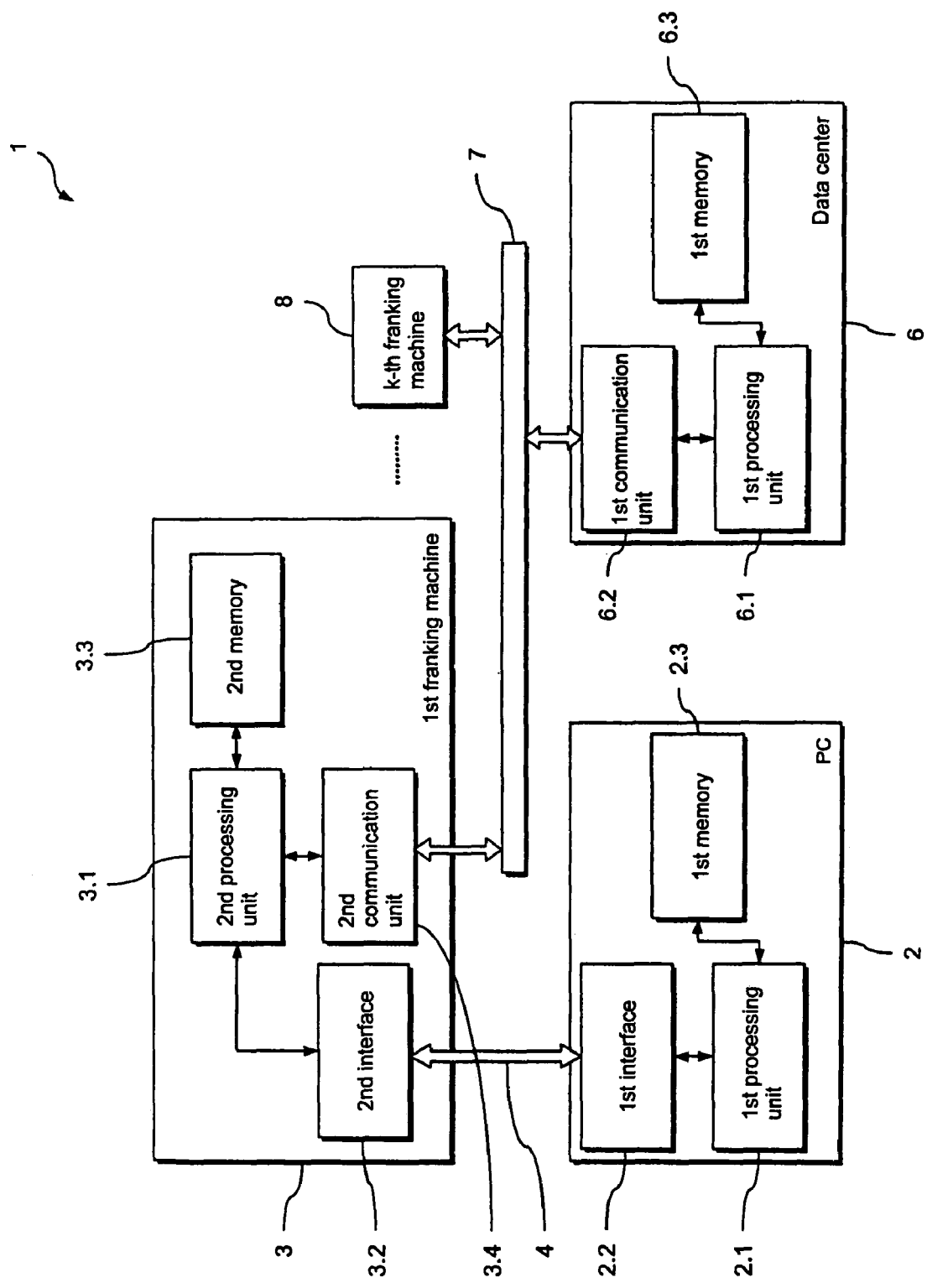
FIG. 1 is a schematic representation of a preferred embodiment of the inventive arrangement with which a preferred embodiment of the inventive method for preparation of data and of the inventive method for loading of data can be implemented.

FIG. 1 is a schematic representation of an inventive arrangement 1 with a first data processing device in the form of a personal computer (PC) 2 and a second data processing device in the form of a franking machine 3.

The PC 2 has a first processing unit 2.1 that is connected with a first interface 2.2 and a first memory 2.3. The franking machine 3 has a processing unit 3.1 that is connected with a second interface 3.2 and a second memory 3.3.

The PC 2 is a PC of a service technician with which first data (in the form of a specific service program according to a variant of the inventive method for loading of data) should be loaded from the first memory 2.3 into the franking machine 3. For this purpose, the PC 2 is connected with the second interface 3.2 of the franking machine 3 via the first interface 2.2 by means of a data connection 4.

To prepare and load the first data into the franking machine 3, the first processing unit 2.1 of the PC 2 accesses a first program stored in the first memory 2.3, the first program provides the subsequently-described functions of the PC 2 or of its processing unit 2.1. To load the first data, the second processing unit 3.1 of the franking machine 3 accesses a second program (for example a boot loader) stored in the second memory 3.3, the second program subsequently providing the described functions of the second processing unit 3.1.

Figure 2:
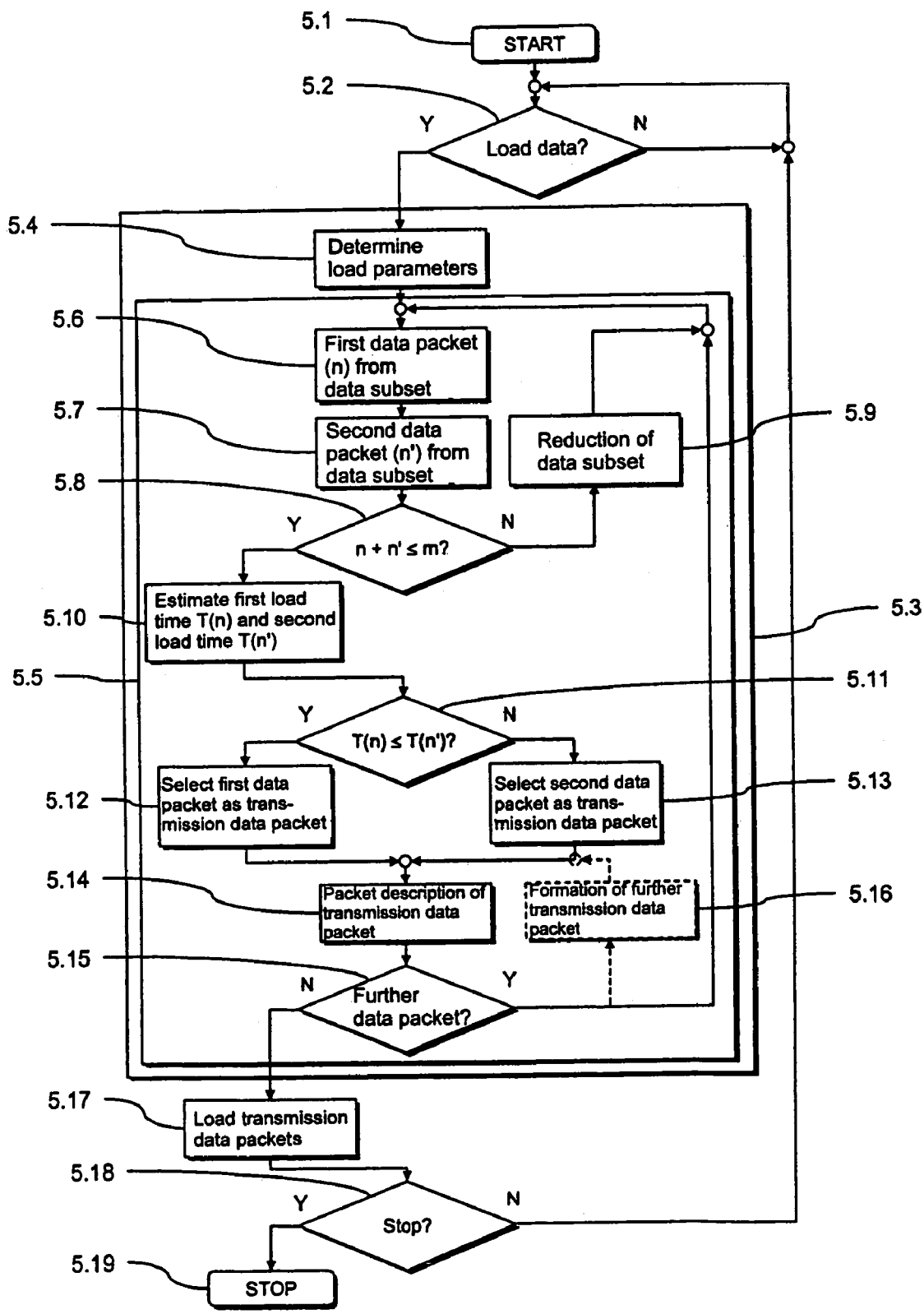
FIG. 2 is a flowchart of a preferred embodiment of the inventive method for loading of data using a preferred embodiment of the inventive method for preparation of data that is implemented with the arrangement of FIG. 1.
Figure 3:
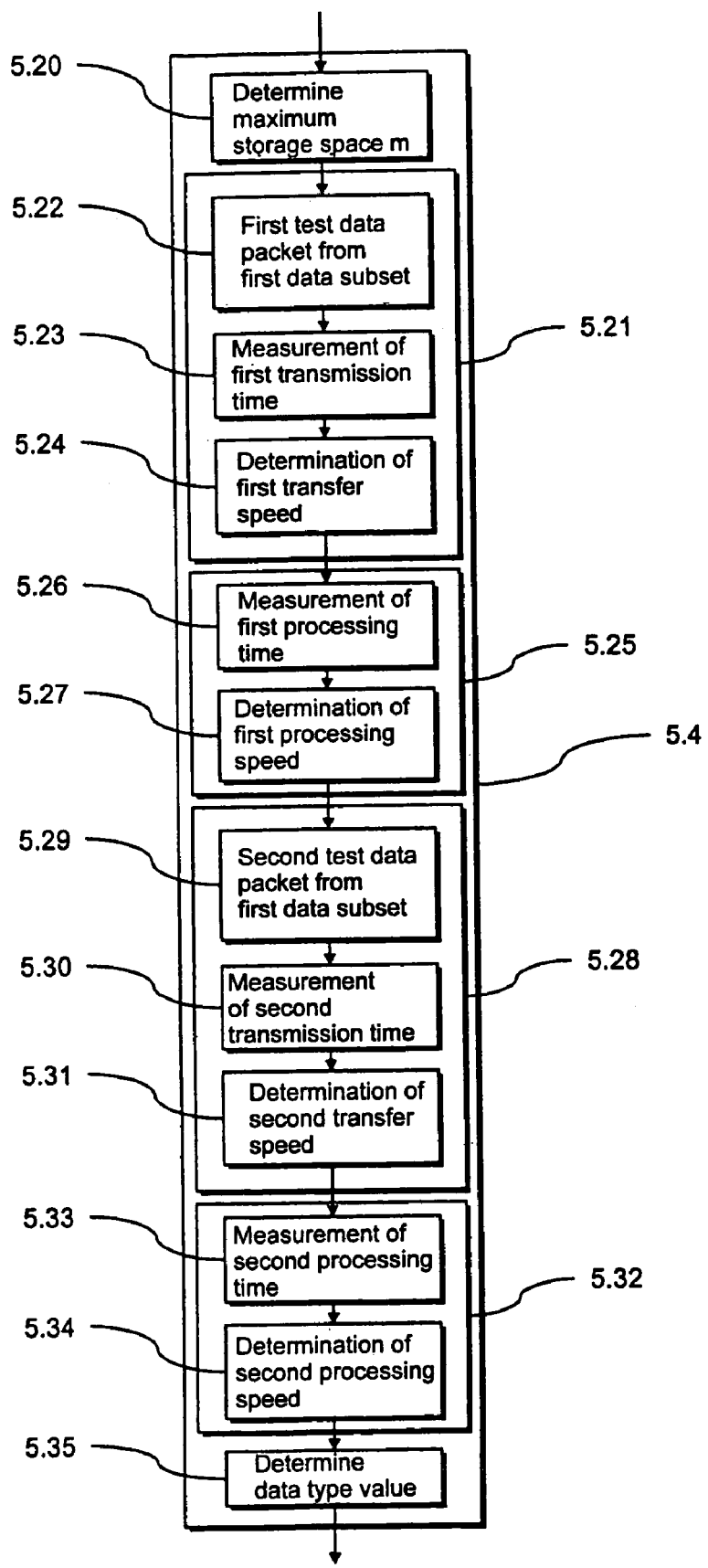
FIG. 3 is a detail of the flowchart of FIG. 2.

In the following, a preferred embodiment of the inventive method for loading data is described with reference to FIGS. 1 through 3, using a preferred embodiment of the inventive method for preparation of data, the method being implemented with the arrangement of FIG. 1.

The method workflow is initially started in a step 5.1. In a step 5.2, the processing unit 2.1 checks whether a request exists for loading of first data into the franking machine 3.

Should the loading of the first data ensue, the first processing unit 2.1 prepares the first data in a preparation step 5.3 according to a preferred embodiment of the inventive method for preparation of data for loading.

In a determination step 5.4, a number of first load parameters that influence the total load time until the complete loading of the first data into the franking machine 3 are thereby determined by the first processing unit 2.1. Among these first load parameters are:

- the maximal storage capacity m of the second memory 3.3 which the second processing unit 3.1 provides for the processing of the data transmitted from the PC 2;
- a first processing speed value v that is representative of the processing speed of the second processing unit 3.1 given the processing of uncompressed data packets;
- a second processing speed value v' that is representative of the processing speed of the second processing unit 3.1 given the processing of compressed data packets;
- a second transfer speed value u that is representative of the transfer speed of the data connection 4 given the transfer of uncompressed data packets between the PC 2 and the franking machine 3;
- a first transfer speed value u' that is representative of the transfer speed of the data connection 4 given the transfer of compressed data packets between the PC 2 and the franking machine 3;
- a data type value representative of the type of the first data.

The determination of these first load parameters ensues largely experimentally and is explained in further detail with reference to FIG. 3.

In this context it is understood that the determination of the first load parameters in other variants of the invention can ensue such that at least one part of the first load parameters is stored in the first memory 2.3 of the PC and is identified and loaded using an identification of the franking machine 3. Additionally or alternatively, at least one part of the first load parameters can be stored in the second memory 3.3 of the franking machine 3 and be transmitted to the PC 2 automatically or at the request of the PC 2. The first load parameters can have been experimentally determined beforehand or can be determined using technical data of the data connection 4 and the franking machine 3.

A distribution of the first data into a number of data packets that are subsequently transmitted to the franking machine 3 and processed therein then ensues in a packetizing step 5.5.

In a step 5.6, a first data subset of the first data is initially formed by the first processing unit 2.1 and a first data packet of the size n is in turn formed from this first data subset. In a step 5.7, a second data packet of the size n' is furthermore formed by the first processing unit 2.1 from the first data subset by data compression.

The formation of the first data subset ensues using a predetermined formula under consideration of the data type value, which supplies information about the compressibility of the first data subset and therewith an indication with regard to the size of the second data packet.

In a step 5.8, the first processing unit 2.1 checks whether the sum S of the size n of the first data packet and the size n' of the second data packet is smaller than or equal to the maximum storage capacity m of the franking machine 3 that is available for the processing of data packets. If this is not the case, the first processing unit 2.1 reduces the first data subset in a step 5.9 and repeats the steps 5.6 through 5.8.

In other variants of the invention, an increase of the degree of compression in the generation of the second data packet in order to correspondingly reduce the sum S can also be effected in addition to or instead of the reduction of the first data subset.

If the sum S is smaller than or equal to the storage capacity m, an estimation by the first processing unit 2.1 of the first load time T(n) of the first data packet into the franking machine 3 (thus the time until the complete allocation of the first data subset in the franking machine 3) given transmission thereby in the form of a first data packet thus initially ensues in a step 5.10. This first load time T(n) is determined using a part of the first load parameters in a first estimation according to the following equation:

$$T(n) = \frac{n}{u} + \frac{n}{v}, \quad (1)$$

wherein:
n: size of the first data packet;
u: first transfer speed value for uncompressed data;
v: first processing speed value for uncompressed data.

Furthermore, an estimation by the first processing unit 2.1 of the second load time T(n') of the second data packet into the franking machine 3 (thus the time until the complete allocation of the first data subset in the franking machine 3) given its transmission in the form of the second data packet ensues in the step 5.10. This second load time T(n') is determined using a part of the first load parameters in a second estimation according to the following equation:

$$T(n') = \frac{n'}{u'} + \frac{n'}{v'}, \quad (2)$$

wherein:
n': size of the second data packet;
u': second transfer speed value for compressed data;
v': second processing speed value for compressed data.

The first load time and the second load time are compared in a step 5.11. If the first load time is smaller than or equal to the second load time, in a step 5.12 the first processing unit 2.1 selects the first data packet as a transmission data packet for the transmission to the franking machine 3. Otherwise, in a step 5.13 the first processing unit 2.1 selects the second data packet as a transmission data packet for the transmission to the franking machine 3.

It is thus ensured in a simple manner that that data packet with the shorter load time is always selected. In other words, the method achieves a distribution of the first data ensues optimized with regard to an optimally fast availability of the first data in the franking machine 3.

In a step 5.12, the first processing unit 2.1 adds [appends] a packet description to the transmission data packet, using which packet description the franking machine 3 then effects the processing of the transmission data packet. The packet description in particular includes information as to whether the transmission data packet is a compressed or uncompressed data packet. Using this information, the franking machine 3 can then immediately establish whether the transmission data packet must be initially prepared (thus decompressed) or whether it can be further processed immediately.

In a step 5.15, the first processing unit 2.1 checks whether further data packets must still be generated in order to conclude the distribution of the first data in transmission data packets. If this is the case, the workflow jumps back to step 5.6 and the steps 5.6 through 5.14 are repeated for a new first data subset. The first data are consequently subdivided into a series of transmission data packets that are, if applicable, of different sizes.

In other variants of the invention (in particular dependent on the data type of the first data) upon establishment in the step 5.15 of further data packets still to be generated it can also be provided that the further transmission data packets are then generated in a step 5.16 (indicated dashed in FIG. 2) corresponding to the data packet selected in step 5.12 or 5.13. With regard to a fast packetizing this can in particular be reasonable for parts of the first data that are persistently comprised of the same data type, such that the compression of an arbitrary data subset of a predetermined size from these data always results in a second data packet of essentially equal size.

If all transmission data packets to be generated are generated, these are loaded into the franking machine 3 in a load step 5.17. The first processing unit 2.1 initially sends the first transmission data packet to the second processing unit 3.1. The second processing unit 3.1 then reads the packet description. Given complete receipt of the first transmission data packet which the second processing unit 3.1 checks using the packet description, this is acknowledged to the first processing unit 2.1 by the second processing unit 3.1 in the form of a receipt acknowledgement.

Dependent on the packet description, the second processing unit 3.1 effects the processing of the transmission data packet. As mentioned, the packet description comprises information as to whether the transmission data packet is a compressed or uncompressed data packet. Dependent on this information, the transmission data packet is, if applicable, initially decompressed before it is processed further.

The complete processing (thus the complete allocation) of the content of the transmission data packet into the franking machine 3 is likewise acknowledged to the first processing unit 2.1 by the second processing unit 3.1 in the form of a processing acknowledgement. After the receipt acknowledgement and the processing acknowledgement, the first processing unit 2.1 proceeds with the transmission of the next transmission data packet. This occurs until all transmission data packets have been transferred or the loading has terminated due to an error.

In other variants of the invention, each transmission data packet is immediately transmitted after its completion [finalization] in the step 5.14. In other words, it can thus also be provided that the step 5.17 is implemented for the respective transmission data packet between the step 5.14 and the step 5.15.

If the loading has concluded, in a step 5.18 it is finally checked whether the method workflow should be ended. If this is the case, the method workflow ends in a step 5.19. Otherwise the workflow jumps back to the step 5.2.

In the following, the determination of the first load parameters in the step 5.4 is explained with reference to FIGS. 2 and 3.

The determination of the maximum storage capacity m of the second memory 3.3 which the second processing unit makes available for the processing of the data transmitted from the PC 2 initially ensues in a step 5.20. These data are requested by the first processing unit 2.1 from the second processing unit 3.1.

In a first test step 5.21, the first processing unit 2.1 initially generates a first test data packet of the size t from a first test data set in a step 5.22 according to a predetermined scheme. In a step 5.23 of the first test step 5.21, the first processing unit 2.1 transmits the first test data packet to the second processing unit 3.1 and measures the first transmission time $T_u$ of the first test data packet using a receipt acknowledgement of the second processing unit 3.1. In a step 5.24 of the first test step 5.21, the first processing unit 2.1 determines the first transfer speed value u from the first transmission time $T_u$ and the first test data packet size t according to the equation:

$$u = \frac{t}{T_u}. \qquad (3)$$

In a second test step 5.25, the second processing unit 3.1 initially processes the first test data packet in a step 5.26 and thereby measures the first processing time $T_v$ of the first test data packet until the complete availability of the first test data set in the franking machine 3. In a step 5.27 of the second test step 5.25, the second processing unit 3.1 transmits the processing time $T_v$ to the first processing unit 2.1. The latter then determines the first processing speed value v from the first processing time $T_v$ and the first test data packet size t according to the equation:

$$v = \frac{t}{T_v}. \qquad (4)$$

In a third test step 5.28, the first processing unit 2.1 initially generates a second test data packet of the size t' in a step 5.29 according to a predetermined scheme under compression of the first test data set. In a step 5.30 of the third test step 5.28, the first processing unit 2.1 transmits the second test data packet to the second processing unit 3.1 and measures the second transmission time $T'_u$ of the second test data packet using a receipt acknowledgement of the second processing unit 3.1. In a step 5.31 of the third test step 5.28, the first processing unit 2.1 determines the second transfer speed value u' from the second transmission time $T'_u$ and the second test data packet size t' according to the equation:

$$u' = \frac{t'}{T'_u}. \quad (5)$$

In a fourth test step 5.32, the second processing unit 3.1 initially processes the second test data packet in a step 5.33 and thereby measures the second processing time $T'_v$ of the second test data packet until the complete availability of the first test data set in the franking machine 3. In a step 5.34 of the second test step 5.32, the second processing unit 3.1 transmits the second processing time $T'_v$ to the first processing unit 2.1. The latter then determines the second processing speed value v' from the second processing time $T_v$ and the second test data packet size t' according to the equation:

$$v' = \frac{t'}{T'_v}. \quad (6)$$

In a step 5.35 as a last sub-step of the determination step 5.4, the first processing unit 2.1 finally determines the data type value from the first data.

Figure 4:
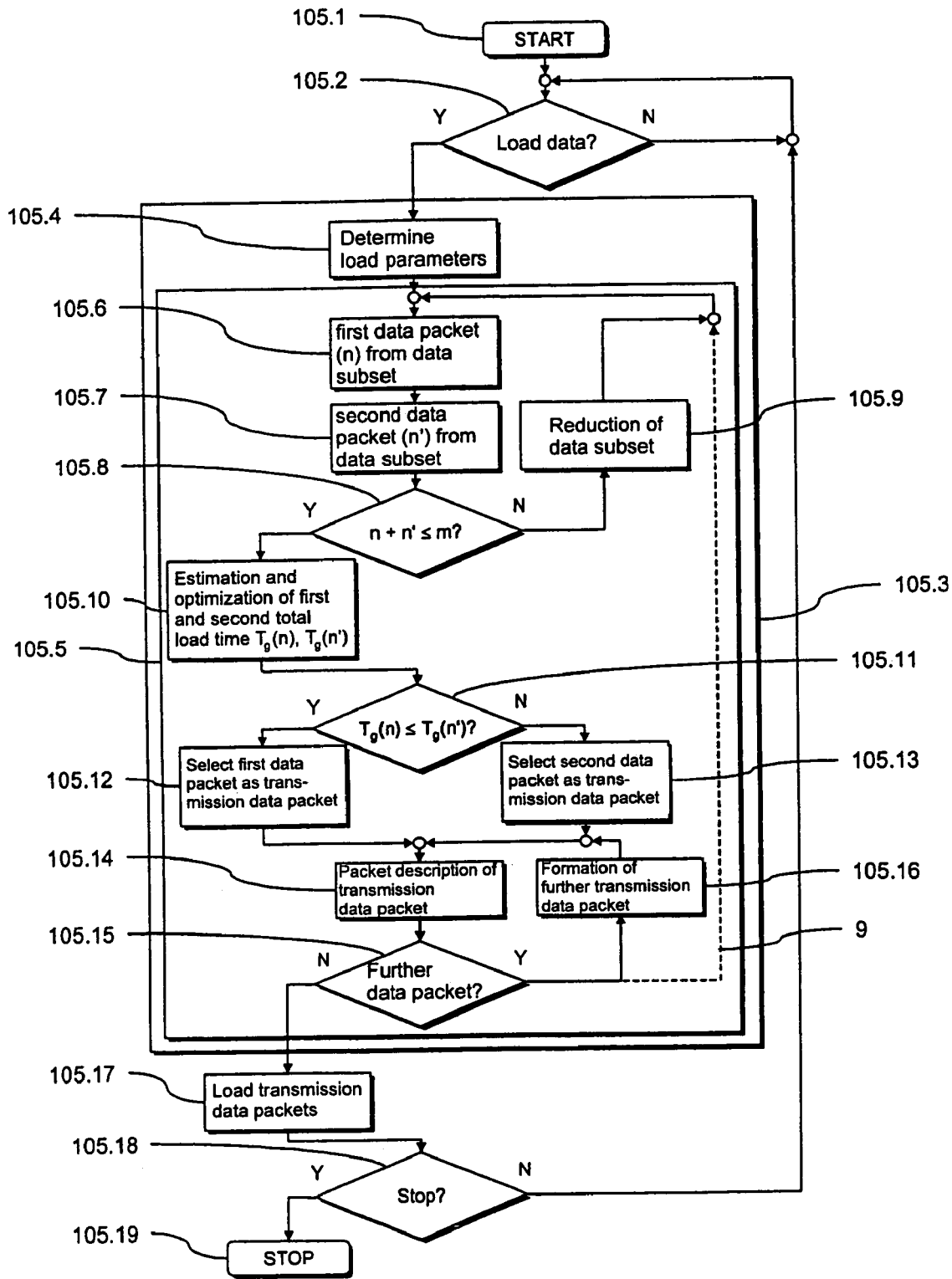
FIG. 4 is a flowchart of a further preferred embodiment of the inventive method for loading of data using a preferred embodiment of the inventive method for preparation of data that can be implemented with the arrangement of FIG. 1.
Figure 5:
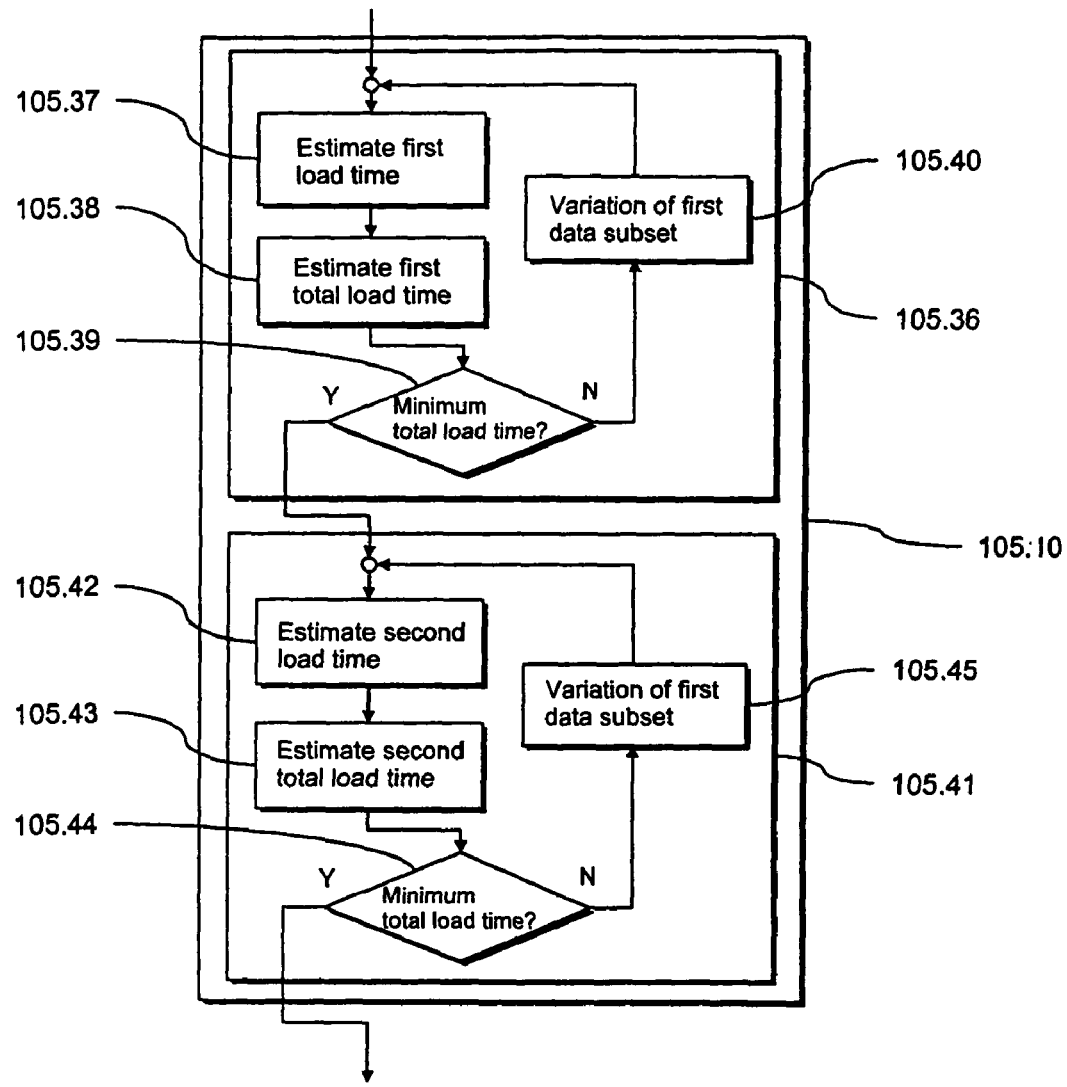
FIG. 5 is a detail of the flowchart of from FIG. 4.

In the following, a further preferred embodiment of the inventive method for loading of data using a preferred embodiment of the inventive method for preparation of data, the method being implemented with the arrangement from FIG. 1, is described with respect to FIGS. 1, 4 and 5.

In the present example, first data are transferred from a remote data center 6 to the franking machine 3 via a communication network 7. The data center 6 has a first processing unit 6.1 that is connected with a first communication unit 6.2 and a first memory 6.3. To load the first data from the data center 6 into the franking machine 3, a data connection between the data center 6 and the franking machine 3 is established via the first communication unit 6.2, the communication network 7 and the second communication unit 3.4 of the franking machine 3.

The method workflow is initially started in a step 105.1. In a step 105.2, the processing unit 6.1 checks whether a request exists for loading of first data into the franking machine 3.

Should the loading of the first data ensue, the first processing unit 6.1 prepares the first data in a preparation step 105.3 according to a preferred embodiment of the inventive method for preparation of data for loading.

In a determination step 105.4, a plurality of first load parameters which influence the total load time until the complete loading of the first data into the franking machine 3 are thereby determined by the first processing unit 6.1. Among these first load parameters are:

the maximal storage capacity m of the second memory 3.3 which the second processing unit makes available for the processing of the data transmitted from the data center 6;

a second processing speed value v that is representative of the processing speed of the second processing unit 3.1 given the processing of uncompressed data packets;

a second processing speed value v' that is representative of the processing speed of the second processing unit 3.1 given the processing of compressed data packets;

a first transfer speed value u that is representative of the transfer speed of the data connection 7 given the transfer of uncompressed data packets between the data center 6 and the franking machine 3;

a first transfer speed value u' that is representative of the transfer speed of the data connection 7 given the transfer of compressed data packets between the data center 6 and the franking machine 3;

a data type value representative of the type of the first data.

The determination of these first load parameters in the determination step 105.3 ensues largely in experimental ways as this was described above in connection with FIG. 3, such that the statements above are referenced in this regard.

At least one part of the first load parameters can be stored in the first memory 6.3 of the data center and be identified and loaded using an identification of the franking machine 3.

Corresponding first load parameters are stored in the first memory 6.3 of the data center 6 for all k franking machines 3, 8.

Additionally or alternatively, at least one part of the corresponding first load parameters can be stored in the second memory 3.3 of the franking machine 3 and be transmitted to the data center 6 automatically or at the request of the data center 6. The first load parameters can thereby have been experimentally determined beforehand or using technical data of the data connection 7 and the franking machine 3.

A distribution of the first data into a plurality of data packets which are subsequently transmitted to the franking machine 3 and processed by the latter then ensues in a packetizing step 105.5.

In a step 105.6, a first data subset of the first data is initially formed by the first processing unit 6.1 and a first data packet of the size n is in turn formed from this first data subset. In a step 105.7, a second data packet of the size n' is furthermore formed by the first processing unit 6.1 from the first data subset via data compression.

The formation of the first data subset thereby ensues using a predetermined scheme under consideration of the data type value, which supplies information about the compressibility of the first data subset and therewith an indication with regard to the size of the second data packet.

In a step 105.8, the first processing unit 6.1 checks whether the sum S of the size n of the first data packet and the size n' of the second data packet is smaller than or equal to the maximum storage capacity m of the franking machine 3 that is available for the processing of data packets. If this is not the case, the first processing unit 6.1 reduces the first data subset in a step 105.9 and repeats the steps 105.6 through 105.8.

In other variants of the invention, an increase of the degree of compression in the generation of the second data packet in order to correspondingly reduce the sum S can also be effected in addition to or instead of the reduction of the first data subset.

If the sum S is smaller than or equal to the storage capacity m, an estimation by the first processing unit 6.1 of the first total load time $T_g(n)$ of the first data into the franking machine 3 (thus the time until the complete allocation of the first data in the franking machine 3) given a distribution of the first data into z first data packets of the size of the first data subset thus initially ensues in a step 105.10, as is subsequently explained in further detail below.

Furthermore, an estimation by the first processing unit 6.1 of the second load time $T_g(n')$ of the second data packet into the franking machine 3 (thus the time until the complete allocation of the first data in the franking machine 3) given a distribution of the first data into z first data packets of the size n' ensues in the step 105.10, as is likewise explained in further detail.

The first total load time $T_g(n)$ and the total second load time $T_g(n')$ are compared in a step 105.11. If the first total load time is smaller than or equal to the total second load time, in a step 105.12 the first processing unit 6.1 selects the first data packet as a transmission data packet for the transmission to the franking machine 3. Otherwise, in a step 105.13 the first processing unit 6.1 selects the second data packet as a transmission data packet for the transmission to the franking machine 3.

It is thus ensured in a simple manner that the data packet with the shorter total load time is always selected. In other words, the method achieves a distribution of the first data that is optimized with regard to an optimally fast availability of the first data in the franking machine 3.

In a step 105.12, the first processing unit 6.1 adds a packet description to the transmission data packet, using which packet description the franking machine 3 then effects the processing of the transmission data packet. The packet description includes information as to whether the transmission data packet is a compressed or uncompressed data packet. Using this information, the franking machine 3 can then immediately establish whether the transmission data packet must be initially prepared (thus decompressed) or whether it can be further processed immediately.

In a step 105.15, the first processing unit 6.1 checks whether further data packets must still be generated in order to conclude the distribution of the first data in transmission data packets.

If this is the case, the further transmission data packets are then generated in a step 105.16 corresponding to the data packet selected in step 105.12 or 105.13. In other variants of the invention that the workflow jumps back to step 105.6 for generation of further transmission data packets, as indicated in FIG. 4 by the dashed connection 9.

If all transmission data packets to be generated are generated, these are loaded into the franking machine 3 in a load step 105.17. The first processing unit 6.1 thereby initially sends the first transmission data packet to the second processing unit 3.1. The second processing unit 3.1 then reads the packet description. Given complete receipt of the first transmission data packet which the second processing unit 3.1 checks using the packet description, this is acknowledged to the first processing unit 6.1 by the second processing unit 3.1 in the form of a receipt acknowledgement.

Dependent on the packet description, the second processing unit 3.1 effects the processing of the transmission data packet. As mentioned above, the packet description comprises information as to whether the transmission data packet is a compressed or uncompressed data packet. Dependent on this information, the transmission data packet is, if applicable, initially decompressed before it is processed further.

The complete processing (thus the complete allocation) of the content of the transmission data packet into the franking machine 3 is likewise acknowledged to the first processing unit 6.1 by the second processing unit 3.1 in the form of a processing acknowledgement. After the receipt acknowledgement and the processing acknowledgement, the first processing unit 6.1 proceeds with the transmission of the next transmission data packet. This occurs until all transmission data packets have been transferred or the loading has been terminated due to an error.

In other variants of the invention, each transmission data packet can be immediately transmitted after its completion in the step 105.14. In other words, the step 105.17 is implemented for the respective transmission data packet between the step 105.14 and the step 105.15.

If the loading has concluded, in a step 105.18 it is finally checked whether the method workflow should be ended. If this is the case, the method workflow ends in a step 105.19. Otherwise the workflow jumps back to the step 105.2.

In the following, the estimation and optimization of the total load times in the step 105.4 is explained with reference to FIGS. 4 and 5.

An estimation and optimization of the first total load time initially ensues in a first optimization step 105.36. In a step 105.37, the first load time $T(n)$ of the first data packet is initially determined with the size n of the first data packet, the first transfer speed value u for uncompressed data and the first processing speed value v for uncompressed data in a first estimation according to the equation (1).

In a step 105.38, the first total load time $T_g(n)$ is subsequently estimated with the first load time $T(n)$ for the z first data packets in a third estimation according to following equation:

$$T_g(n) = z \cdot T(n) \quad (7)$$

As already mentioned, the first total load time is the time that elapses until the complete allocation of the first data in the franking machine 3 given a distribution of the first data in first data packets of the size of the first data subset.

A check as to whether the first total load time has reached a minimum then ensues in a step 105.39. If this is not the case, in a step 105.40 the size of the first data subset is varied and the steps 105.37 through 105.39 are then repeated.

Given the repeated cycling of the step 105.39, the determined new first total load time is compared with the determined previous first total load time in a first total load time comparison. If the new first total load time is smaller than the previous first total load time, the possibility of a further reduction consequently exists. In the subsequent step 105.40, a further variation of the first data subset in the same direction is then effected and the steps 105.37 through 105.39 are then newly repeated.

This occurs until a rise of the total load time is registered in a repeated step 105.39 or a predetermined lower limit value of the first total load time is achieved. The new rise of the first total load time is thereby an indication that the first total load time has approached a minimum of the first total load time with a certain tolerance. Depending on the size of the current variation of the first total load time and the predetermined tolerance, the optimization can be terminated at this point or can be continued with smaller variation steps.

An estimation and optimization of the second total load time then ensues in a second optimization step 105.41. In a step 105.42, the second load time $T(n')$ of the first data packet [sic] is initially determined with the size n' of the compressed second data packet, the second transfer speed value u' for compressed data and the second processing speed value v' for compressed data in a second estimation according to the equation (2).

In a step 105.43, the second total load time $T_g(n')$ is subsequently estimated with the second load time $T(n')$ for the z' second data packets in a fourth estimation according to following equation:

$$T_g(n') = z' \cdot T(n') \quad (8)$$

As already mentioned, the second total load time is the time that elapses until the complete allocation of the first data in the franking machine 3 given a distribution of the first data in compressed first data packets whose size corresponds to that of the compressed first data subset.

A check as to whether the second total load time has reached a minimum then ensues in a step 105.44. If this is not the case, in a step 105.45 the size of the first data subset is varied and the steps 105.42 through 105.44 are then repeated.

Given the repeated cycling of the step 105.44, the determined new second total load time is compared with the determined previous second total load time in a second total load time comparison. If the new second total load time is smaller than the previous second total load time, the possibility of a further reduction consequently exists. In the subsequent step 105.45, a further variation of the first data subset in the same direction is then effected and the steps 105.42 through 105.44 are then newly repeated.

This occurs until a rise of the total load time is registered in a repeated step 105.44 or a predetermined lower limit value of the second total load time is achieved. The new rise of the second total load time is thereby an indication that the second total load time has approached a minimum of the second total load time with a certain tolerance. Depending on the size of the current variation of the second total load time and the predetermined tolerance, the optimization can be terminated at this point or can be continued with smaller variation steps.

The present invention was described using examples in which the generation of the transmission data packets ensues using the comparisons of load times of data packets generated in different manners. It is understood that, in other variants of the invention, as an alternative to or in addition to such a comparison, limit values that case a procedure to occur in the generation of the transmission data packets dependent on whether the limit value is exceeded or not, are provided for one or more of the determined load parameters. For example, a limit value for the processing speed of the second data processing device could be provided that when exceeded, causes compressed transmission data packets always to be used.

Furthermore, the present invention was described using examples with a franking machine. It is understood that the invention can also be used for any other application in which data should be loaded from a first data processing device into a second data processing device.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for preparing data for loading from a first data processing device into a second data processing device via a data connection, comprising the steps of:
   in a determination step in at least one of said first and second data processing devices, determining at least one load parameter that influences a total load time for complete loading of data from the first data processing device into the second data processing device;
   in a packetizing step in said first data processing device following said determination step, automatically electronically generating a plurality of transmission-ready transmission data packets from said data dependent on said at least one load parameter;
   In said determination step, determining said at least one load parameter as a maximum storage capacity available at said second data processing device for processing said plurality of transmission data packets; and
   in said first data processing device, forming a test data packet from a test data set within said data, and transmitting said test data packet from said first data processing device to said second data processing device, and determining said at least one load parameter in said second data processing device dependent on said test data packet.

2. A method as claimed in claim 1 comprising determining at least one further load parameter selected from the group consisting of a transfer speed value representing a transfer speed between said first data processing device and said second data processing device, a processing speed value representing a processing speed for processing said plurality of transmission data packets in said second data processing device, and a data value type representing a type of said data, and, in said packetizing step, automatically electronically generating said plurality of transmission-ready data packets from said data dependent on said at least one load parameter and said at least one further load parameter.

3. A method as claimed in claim 1 comprising reading said at least one load parameter from a memory at said first data processing device dependent on at least one of said data connection and said second data processing device.

4. A method as claimed in claim 1 comprising:
   monitoring a transmission time for complete transmission of said test data packet from said first data processing device to said second data processing device; and
   in said second data processing device, determining a transfer speed value, from said transmission time, representing a transfer speed of said test data packet between said first data processing device and said second data processing device, and using said transfer speed as said at least one load parameter.

5. A method as claimed in claim 1 comprising:
   monitoring a processing time until complete availability of the received test data packet in said second data processing device; and
   in said second data processing device, determining a processing speed value, from said processing time, representing a processing speed of said test data packet in said second data processing device, and using said processing speed as said at least one load parameter.

6. A method as claimed in claim 1 wherein said test data packet is a first test data packet, and wherein said determination step comprises:
   in said first data processing device, forming a second test data packet from said test data set; and
   transmitting said second test data packet from said first data processing device to said second data processing device, and determining said at least one load parameter in said second data processing device dependent on said second test data packet.

7. A method as claimed in claim 6 comprising:
   monitoring a transmission time for complete transmission of said second test data packet from said first data processing device to said second data processing device; and
   in said second data processing device, determining a first transfer speed value, from said transmission time, representing a transfer speed of said second test data packet between said first data processing device and said second data processing device, and using said transfer speed as said at least one load parameter.

8. A method as claimed in claim 7 comprising:
   monitoring a processing time until complete availability of the received second test data packet in said second data processing device; and
   in said second data processing device, determining a processing speed value, from said processing time, representing a processing speed of said second test data packet in said second data processing device, and using said processing speed as said at least one load parameter.

9. A method as claimed in claim 6 wherein the step of forming said second test data packet from said test data set comprises forming said second test data packet by compressing at least a portion of said test data set.

10. A method as claimed in claim 1 wherein said packetizing step comprises:
- automatically electronically generating at least one data packet from a data subset of said data; and
- estimating a load time for said first data packet using said at least one load parameter for said data packet.

11. A method as claimed in claim 10 comprising:
- automatically electronically comparing said load time with a load time comparison value, to obtain a comparison result; and
- including said data packet as one of said transmission data packets dependent on said comparison result.

12. A method as claimed in claim 11 wherein said data packet is a first data packet, said at least one load parameter is at least one first load parameter, and wherein said load time is a first load time, and comprising:
- generating a second data packet from said data subset; and
- automatically electronically estimating a second load time for said second data packet using at least one second load parameter for said second data packet.

13. A method as claimed in claim 12 comprising:
- using said second load time as said load time comparison value; and
- selecting either said first data packet or said second data packet as one of said transmission data packets dependent on said comparison result.

14. A method as claimed in claim 13 comprising, as said comparison result, determining which of said first load time and said second load time is shorter, and, as between said first data packet and said second data packet, including the data packet with the shorter load time as said one of said transmission data packets.

15. A method as claimed in claim 14 comprising generating said second data packet by compressing at least a portion of said data subset.

16. A method as claimed in claim 15 comprising:
- in said determination step, determining a maximum storage capacity available in said second data processing device for processing said transmission data packets, as a first load parameter;
- forming a storage capacity sum from a first storage capacity required for storage of said first data packet and a second storage capacity required for storage of said second data packet;
- comparing said storage capacity sum with said maximum available storage capacity; and
- if said storage capacity sum exceeds said maximum available storage capacity, generating a new first data packet and a new second data packet, said new second data packet being generated by a generation technique selected from the group consisting of reducing said data subset to generate said new second data packet compared to the data subset used to generate the second data packet, and increasing a compression rate to generate the new second data packet compared to a compression rate used to generate the second data packet.

17. A method as claimed in claim 10 comprising:
(a) automatically electronically estimating a total load time for said data if said data were divided into a plurality of data packets each having a size corresponding to said data subset;
(b) changing the size of said data subset to a changed size;
(c) automatically electronically estimating a total load time of said data if said data were divided into a plurality of data packets each having a size corresponding to the changed size of said data subset;
(d) comparing the total load time estimated in step (a) with the total load time estimated in step (c), to obtain a total load time comparison result.

18. A method as claimed in claim 17 comprising:
(e) dependent on said comparison result, changing the size of said data subset to a further changed size and estimating a total load time of said data if said data were divided into a plurality of data packets each having a size corresponding to said further changed size, to obtain a comparison result; and
(f) repeating step (d) with the total load time estimated in step (e) substituted for the total load time estimated in step (a).

19. A method as claimed in claim 18 comprising repeating steps (e) and (f) until the total load time is within a predetermined range around a predetermined minimum.

20. A method as claimed in claim 19 comprising:
(g) automatically electronically estimating a second total load time for said data if said data were divided into a plurality of second data packets each having a size corresponding to said data subset;
(h) changing the size of said data subset to a changed size;
(i) automatically electronically estimating a second total load time of said data if said data were divided into a plurality of second data packets each having a size corresponding to the changed size of said data subset;
(j) comparing the second total load time estimated in step (a) with the second total load time estimated in step (c), to obtain a second total load time comparison result.

21. A method as claimed in claim 17 comprising:
(k) dependent on said comparison result, changing the size of said data subset to a further changed size and estimating a second total load time of said data if said data were divided into a plurality of second data packets each having a size corresponding to said further changed size, to obtain a comparison result; and
(L) repeating step (j) with the second total load time estimated in step (k) substituted for the second total load time estimated in step (g).

22. A method as claimed in claim 21 comprising repeating steps (k) and (l) until said total load time is within a predetermined range around a minimum.

23. A method as claimed in claim 22 comprising comparing said first minimum and said second minimum to obtain a minimum comparison result, and selecting a data packet with a lowest total load time, as indicated by said minimum comparison result, for inclusion as one of said transmission data packets.

24. An arrangement for preparing data for loading from a first data processing device into a second data processing device via a data connection, comprising:
- a first data processing device, a second data processing device, and a data connection between the first and second processing devices;
- at least one of said first and second data processing devices in a determination step, determining at least one load parameter that influences a total load time for complete loading of data from the first data processing device into the second data processing device;
- said first data processing device, in a packetizing step following said determination step, automatically generating a plurality of transmission-ready transmission data packets from said data dependent on said at least one load parameter;
- in said at least one of said first and second data processing devices in said determination step, determining said at least one load parameter as a maximum memory storage capacity available at said second data processing device for processing said plurality of transmission data packets:

said first data processing device, in said determination step, forms a testing data packet from a test data set within said data; and transmitting said test data packet from said first data processing device to said second data processing device; and said second data processing device, in that determination step, determines said at least one load parameter dependent on said test data packet.

25. An arrangement as claimed in claim 24 wherein said at least one of said first and second data processing devices determines at least one further load parameter selected from the group consisting of a transfer speed value representing a transfer speed between said first data processing device and said second data processing device, a processing speed value representing a processing speed for processing said plurality of transmission data packets in said second data processing device, and a data value type representing a type of said data and wherein said first data processing device, in said packetizing step, automatically generates said plurality of transmission-ready transmission data packets from said data dependent on said at least one load parameter and said at least one further load parameter.

26. An arrangement as claimed in claim 24 comprising a memory accessible by said first data processing device, and wherein said first data processing device reads said at least one load parameter from said memory dependent on at least one of said data connection and said second data processing device.

27. An arrangement as claimed in claim 24 wherein said second data processing device monitors a transmission time for complete transmission of said test data packet from said first data processing device to said second data processing device, and determines a transfer speed value, from said transmission time, representing a transfer speed of said test data packet between said first data processing device and said second data processing device, and uses said transfer speed as said at least one load parameter.

28. An arrangement as claimed in claim 24 wherein said second data processing device monitors a processing time until complete availability of the received test data packet in said second data processing device, and determines a processing speed value, from said processing time, representing a processing speed of said test data packet in said second data processing device, and uses said processing speed as said at least one load parameter.

29. An arrangement as claimed in claim 24 wherein said test data packet is a first test data packet, and wherein:

said first data processing device, in said determination steps, forms a second test data packet from said test data set; and transmits said second test data packet from said first data processing device to said second data processing device; and said second data processing device, in said determination step, determines said at least one load parameter dependent on said second test data packet.

30. An arrangement as claimed in claim 29 wherein said second data processing device monitors a transmission time for complete transmission of said second test data packet from said first data processing device to said second data processing device, and determines a first transfer speed value, from said transmission time, representing a transfer speed of said second test data packet between said first data processing device and said second data processing device, and uses said transfer speed as said at least one load parameter.

31. An arrangement as claimed in claim 30 wherein said second data processing device monitors a processing time until complete availability of the received second test data packet in said second data processing device, and determines a processing speed value, from said processing time, representing a processing speed of said second test data packet in said second data processing device, and uses said processing speed as said at least one load parameter.

32. An arrangement as claimed in claim 30 wherein said first data processing device forms said second test data packet from said test data set comprises forming said second test data packet by compressing at least a portion of said test data set.

33. An arrangement as claimed in claim 24 wherein said first data processing device, in said packetizing step, generates at least one data packet from a data subset of said data, and estimates a load time for said first data packet using said at least one load parameter for said data packet.

34. An arrangement as claimed in claim 33 wherein said first data processing device automatically electronically compares said load time with a load time comparison value, to obtain a comparison result, and includes said data packet as one of said transmission data packets dependent on said comparison result.

35. An arrangement as claimed in claim 34 wherein said data packet is a first data packet, said at least one load parameter is at least one first load parameter, and wherein said load time is a first load time, and wherein said first data processing device generates a second data packet from said data subset, and estimates a second load time for said second data packet using at least one second load parameter for said second data packet.

36. An arrangement as claimed in claim 35 wherein said first data processing device uses said second load time as said load time comparison value; and selects either said first data packet or said second data packet as one of said transmission data packets dependent on said comparison result.

37. An arrangement as claimed in claim 36 wherein said first data processing device, as said comparison result, determines which of said first load time and said second load time is shorter, and, as between said first data packet and said second data packet, includes the data packet with the shorter load time as said one of said transmission data packets.

38. An arrangement as claimed in claim 37 wherein said first data processing device generates said second data packet by compressing at least a portion of said data subset.

39. An arrangement as claimed in claim 38 wherein said first data processing device, in said determination step, determines a maximum storage capacity available in said second data processing device for processing said transmission data packets, as a first load parameter forms a storage capacity sum from a first storage capacity required for storage of said first data packet and a second storage capacity required for storage of said second data packet, compares said storage capacity sum with said maximum available storage capacity, and if said storage capacity sum exceeds said maximum available storage capacity, generates a new first data packet and a new second data packet, said new second data packet being generated by a generation technique selected from the group consisting of reducing said data subset to generate said new second data packet compared to the data subset used to generate the second data packet, and increasing a compression rate to generate the new second data packet compared to a compression rate used to generate the second data packet.

40. An arrangement as claimed in claim 34 wherein said first data processing device, in said determination and packetizing steps, executes an algorithm, (a) estimating a total load time for said data if said data were divided into a plurality of data packets each having a size corresponding to said data subset;
(b) changing the size of said data subset to a changed size;
(c) estimating a total load time of said data if said data were divided into a plurality of data packets each having a size corresponding to the changed size of said data subset;
(d) comparing the total load time estimated in step (a) with the total load time estimated in step (c), to obtain a total load time comparison result.

41. An arrangement as claimed in claim 40 wherein said first data processing device, in said determination and packetizing steps, executes an algorithm comprising:
(e) dependent on said comparison result, changing the size of said data subset to a further changed size and estimating a total load time of said data if said data were divided into a plurality of data packets each having a size corresponding to said further changed size, to obtain a comparison result; and
(f) repeating step (d) with the total load time estimated in step (e) substituted for the total load time estimated in step (a).

42. An arrangement as claimed in claim 40 wherein said first data processing device, in said determination and packetizing steps, executes an algorithm comprising repeating steps (e) and (f) until the total load time is within a predetermined range around a predetermined minimum.

43. An arrangement as claimed in claim 42 wherein said first data processing device, in said determination and packetizing steps, executes an algorithm comprising:
(g) estimating a second total load time for said data if said data were divided into a plurality of second data packets each having a size corresponding to said data subset;
(h) changing the size of said data subset to a changed size;
(i) estimating a second total load time of said data if said data were divided into a plurality of second data packets each having a size corresponding to the changed size of said data subset;
(j) comparing the second total load time estimated in step (a) with the second total load time estimated in step (c), to obtain a second total load time comparison result.

44. An arrangement as claimed in claim 41 wherein said first data processing device, in said determination and packetizing steps, executes an algorithm comprising:
(k) dependent on said comparison result, changing the size of said data subset to a further changed size and estimating a second total load time of said data if said data were divided into a plurality of second data packets each having a size corresponding to said further changed size, to obtain a comparison result; and
(l) repeating step (j) with the second total load time estimated in step (e) substituted for the second total load time estimated in step (g).

45. An arrangement as claimed in claim 44 wherein said first data processing device, in said determination and packetizing steps, executes an algorithm comprising repeating steps (k) and (l) until said total load time is within a predetermined range around a minimum.

46. An arrangement as claimed in claim 45 wherein said first data processing device, in said determination and packetizing steps, executes an algorithm comprising comparing said first minimum and said second minimum to obtain a minimum comparison result, and selecting a data packet with a lowest total load time, as indicated by said minimum comparison result, for inclusion as one of said transmission data packets.

\* \* \* \* \*